May 18, 1948. T. A. ST. CLAIR 2,441,911
CHECK VALVE AND STORAGE SYSTEM CONTAINING SAME
Filed June 11, 1945

INVENTOR
T. A. ST. CLAIR
BY Hudson & Young
ATTORNEYS

Patented May 18, 1948

2,441,911

UNITED STATES PATENT OFFICE 2,441,911

CHECK VALVE AND STORAGE SYSTEM CONTAINING SAME

Theodore A. St. Clair, Bartlesville, Okla., assignor to Phillips Petroleum Company, a corporation of Delaware Application June 11, 1945, Serial No. 598,813

2 Claims. (Cl. 62—1)

This invention relates to apparatus for handling liquids. In one more specific aspect it relates to a system for handling liquefied gases. In another more specific aspect it relates to a check valve suitable for use in such a system. In another more specific aspect it relates to a system for pumping liquefied gases in and out of a storage tank, and for dispensing said liquid.

From a standpoint of safety it is essential that all connections to liquefied petroleum gas containers be protected as much as possible from the results of mechanical damage. Under a few special circumstances it is entirely possible to assemble the various tank outlets with their valves and fittings into a relatively small area and protect the assembly with a heavy guard. However on most mobile and on some stationary equipment it is necessary to have pipe lines located in areas which will be vulnerable to breakage through collision. It is standard practice in the industry then (and regulations are set up by various governing bodies) to equip each and every connection to the tank, with the exception of the safety relief valve, with either an excess flow valve which will automatically close when a certain predetermined flow is reached or a back flow check valve which is normally closed and which can only be opened when the pressure in the line is substantially greater than the pressure in the tank.

Obviously when back flow check valves are recessed well within the tank proper so that they will not in themselves be damaged, very adequate protection against line breakage is afforded. However excess flow valves are normally open and can only be closed when a certain predetermined flow is reached. There are a number of practical obstacles which might limit the flow through an excess flow valve and prevent its proper functioning. These all resolve to terms of pressure drop.

For instance a given flow will produce a given pressure drop through the excess flow valve and the tubing. Should the differential pressure between the tank and atmosphere be less than the pressure drop in the pipe line the excess flow valve will not close but will continue to flow whatever amount this differential pressure will permit. Even with a relatively high tank pressure, a break in a line on the discharge side of a pump might not permit an excess flow valve to function since the pressure drop across the pump which leads to the point of breakage might too greatly limit the flow. The above remarks have been written in the "conditional" tense, but these failures have been recurring far too frequently.

In order to make certain that the excess flow valve on the pump line always operates promptly, the present invention provides a means of insuring a large increase in flow, in the event of line breakage, regardless of whether the break occurs above or below the pump. This is accomplished by providing a back flow check valve in a line by-passing the pump. In normal operation this valve is held closed by the large difference in pressure between the pump suction and the pump discharge. When a break occurs downstream from the pump there is no longer a sufficient pressure differential to hold the check valve shut. It immediately opens, permitting a large flow through the line and through the excess flow valve, thus causing the latter to function in its usual manner.

The intent of the present invention is to provide a normally closed valve which is automatic in operation and which is open only when there is a break in a line on the discharge side of the pump.

The primary object of this invention is to provide safe equipment for handling liquefied gases, that will be as safe as can be devised, and that will comply with the "Standards of the National Board of Fire Underwriters NBFU Pamphlet No. 58" and all similar standards of safety.

Another object is to provide a suitable system for handling liquefied gases.

Another object is to provide a suitable check valve to use in such a system.

Another object is to provide in combination with a storage tank a safe system for supplying liquid to the tank, and dispensing liquid from the tank.

Numerous other objects and advantages will be apparent to those skilled in the art upon reading the accompanying specification, claims and drawings.

Figure 1:
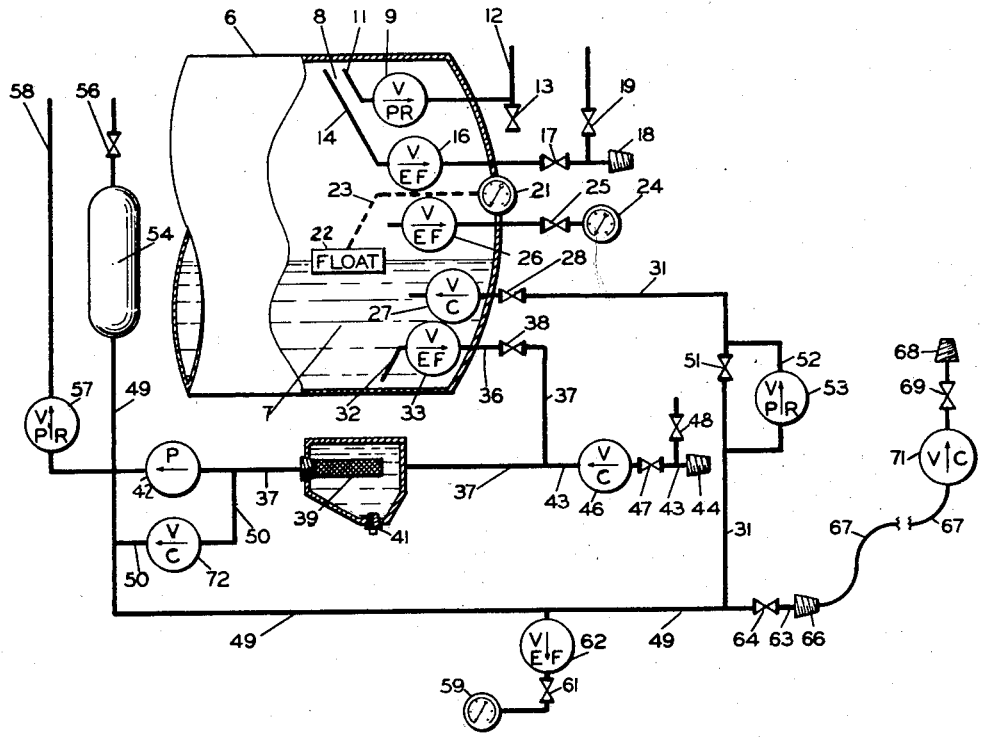
Figure 1 is a diagrammatic elevational view with parts broken away of a storage tank and liquid handling system embodying my invention.

In Figure 1 a storage tank 6 is provided for storing liquefied gas 7 and such vapors 8 as may be present thereover. This tank may or may not be provided with the conventional devices mentioned in the next paragraph.

Tank 6 may be provided with a vapor pressure relief valve 9 preferably located so as to draw vapor from the top of tank 6 through line 11 whenever the pressure inside tank 6 exceeds a predetermined safe pressure and venting said vapors through vent line 12 to the atmosphere. A drain valve 13 may be provided to drain liquids from line 12. Vapor may also be withdrawn from or added to space 8 by line 14 through an excess flow valve 16 and a shut-off valve 17 which may lead to another tank (not shown) which may be connected to coupling 18. Before uncoupling at 18, it is customary to bleed off the gas between valve 17 and the coupling 18 through bleed valve 19. Tank 6 may also be provided with any known type of liquid level gauge 21, the type shown being a magnetic type gauge in which there is no opening through the tank wall of tank 6 but instead in which there is a brass plate in the tank wall through which float 22 transmits the level of liquid 7 by means of a linkage 23 containing a permanent magnet having a magnetic field which moves the steel indicating needle of gauge 21 right through the brass plate (not shown). When any other type of liquid level gauge is used, the usual protective devices customarily accompanying that gauge are preferably also employed. The pressure in tank 6 may be measured by a pressure gauge 24 which may be provided with the usual shut-off valve 25 and the usual excess flow valve 26. Valves 9, 16, 26, and 27 are shown inside of tank 6 and they are actually mounted either inside tank 6 or in the wall of tank 6 so that they cannot be sheared off of tank 6 or otherwise rendered inoperative in case of some accidental force being exerted on the exterior of tank 6. The expression "inside said storage tank" in the claims is intended to cover both these alternative positions, as they are obviously equivalent. It is also customary to provide a protective housing or guard ring (not shown) for such exterior elements as valves 13, 17, 25, 28 and 38 but this protective housing may be eliminated and has therefore not been shown.

A pressure relief valve such as 9 is one that permits transmission of fluid therethrough when a predetermined differential in pressure exists across said valve. An excess flow valve such as 16 may be like Figure 1 of the U. S. patent to Thomas 2,121,936 of June 28, 1938, or any standard excess flow valve and remains open until a predetermined rate of flow exists through the valve whereupon the excess flow valve closes and at least substantially stops said flow. Some excess flow valves shut off the flow completely but many have a bleed passage allowing very minute flow for pressure equalization so the spring may reopen the valve.

The excess flow valves prevent excess flow at least in the direction of the arrow. What these excess flow valves do to flow in the opposite direction is immaterial to the invention, they can be wide open to such opposite flow, or shut it off.

A check valve such as 27 permits flow in one direction only as indicated by the arrow.

Parts 9 to 26, inclusive, do not form any part of my present invention except that they may be advantageously employed in a storage tank also embodying my invention, but are not essential to the operation of my invention.

When the modification of my invention which employs a liquid return line is used, I prefer to have a check valve 27 and a cut-off valve 28 in said liquid return line 31, but it should be noted that many embodiments of my invention need not employ any liquid return line 31 and therefore do not employ check valve 27 nor cut-off valve 28 when line 31 is eliminated.

In order to remove liquid from tank 6 for dispensing or other purposes, a liquid eduction line 32 may be employed to get liquid from as low in the tank as possible. However, eduction line 32 may be omitted.

An excess flow valve 33 is employed in all modifications of my invention and is secured in the wall of the tank 6 or inside said tank.

Attached to valve 33 is a continuation of eduction line 32 which is numbered 37. I may insert a cut-off valve 38 in line 37, the operation of which is described later.

A strainer 39 may be inserted in line 37 and may be provided with a drain plug 41.

Line 37 is attached to the intake side of pump 42 which may be any of the usual type of liquid pumps.

A liquid supply line 43 may be provided attached to line 37 and having the usual coupling 44 to provide a means for inserting liquid into tank 6. However, liquid supply line 43 and related parts may be eliminated if some other means is supplied (not shown) for placing liquid 7 in tank 6. When liquid supply line 43 is employed, I may employ a check valve 46, a shutoff valve 47 and a bleed valve 48 for purposes to be described later.

Attached to the discharge side of pump 42 is a dispensing line 49 which of course could be considered as a portion of return line 31. Connecting any portion of line 37 with any portion of line 49 and/or any portion of line 31 between valve 51 and line 49, is a pump by-pass line 50. Preferably, however, by-pass 50 is connected directly across pump 42 from the intake to the exhaust side, and line 50 is short to save pipe.

Connected to dispensing line 49, in such modifications where a return line is employed, is return line 31, and a shut-off valve 51 may be employed in return line 31, in which case a valve by-pass line 52 may be employed connecting to return line 31 on both sides of valve 51, in which case I prefer to employ a pressure relief valve 53 in by-pass line 52 as shown.

On the exhaust side of pump 42, I may connect a surge chamber 54 to dispensing line 49. Chamber 54 may have a valve 56 for the insertion or removal of "permanent" gases from chamber 54 where they may act as a shock absorber to pulsations created by pump 42.

I may connect a pressure relief valve 57 to line 49 which may be provided with a vent pipe 58 to vent liquids or vapors to the atmosphere when a predetermined pressure in line 49 is reached.

I may measure the pressure in line 49 with a pressure gauge 59 and I may add as safety devices shut-off valve 61 and excess flow valve 62 in the line leading to the pressure gauge 59.

Dispensing line 49 is provided with an extension 63, preferably containing a shut-off valve 64, and may be provided with a coupling 66 and a flexible portion 67 ending in a dispensing end which may be provided with a coupling 68 and a check valve 71.

In pump by-pass line 50 is provided a check valve 72 which allows flow only in the direction of the arrow. A wide opening check valve is preferable so that there will be substantially no pressure drop, or as little pressure drop as possible, in going through the check valve as indicated.

Figure 2:
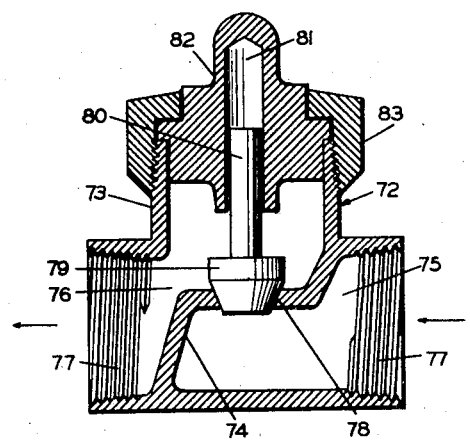
Figure 2 is a sectional elevational view of a type of check valve embodying my invention.

In Figure 2 is shown an enlarged view of the check valve generally designated as 72 which is that shown in Figure 1 in line 50. Check valve 72 consists of a body 73 having a septum 74 separating the body into an intake chamber 75 and an outlet chamber 76. Any type of coupling means may be employed for coupling into line 50, and to illustrate one such simple coupling means, threads 77 are shown. Septum 74 is perforated to form a valve seat 78 which is sealed by a free valve head 79 disposed to be carried by gravity to said seat 78. Head 79 has a guide stem 80 which is guided by guide 81 which is shown in a cap member 82 secured by nipple 83. The exact securing arrangement, and what parts are integral or separable is immaterial, and obviously considerable change in proportion and arrangement of parts may be made within the scope of my invention.

OPERATION

Several operations are possible employing various embodiments of my invention.

Filling tank 6 with liquid—without pump

Liquid may be forced or enter by gravity at 44, pass through valve 38, through excess flow valve 33 and into the tank. Filling without the pump is the procedure which would normally be used.

Filling tank 6 with liquid—with pump

Valve 38 is closed. A source of liquid is attached to coupling 44 and valves 28, 47 and 51 are open. Valves 48, 56 and 64, of course, remain closed. Pump 42 is started and liquid passes through coupling 44, valve 47, check valve 46, strainer 39, pump 42, line 49, line 31, valve 51, line 31, valve 28 and check valve 27 into tank 6.

Dispensing liquid while employing return line 31

Valves 47, 56 and 64 are closed, while valves 28, 38 and 51 are open.

Pump 42 is started allowing liquid 7 to be drawn through lines 32 and 37 into pump 42 and into line 49, where the pressure rises and the liquid flows through line 31 and valve 51 back into tank 6. Upon closing valve 51, pressure in line 49 builds up until relief valve 53 opens, allowing flow of liquid 52 back into tank 6 and keeping a predetermined pressure in line 49.

The system is now ready for dispensing liquid and coupling 68 may be secured to a tank into which the liquid is to be dispensed. Upon opening valve 69 and then 64, pump 42 will pump the liquid through lines 49, 63 and 67 to coupling 68 thus dispensing the liquid.

By maintaining a gas in the upper portion of surge chamber 54 the pulsations of pump 52 may be absorbed in the usual manner. Chamber 54 may be dispensed with if desired and if valve 56 is opened to allow the gas in 54 to escape and is then closed, chamber 54 will be rendered inoperative.

Pressure relief valve 57 prevents breakage of line 49 but may be eliminated as non-essential in some systems.

Pressure gauge 59 and its safety devices 61 and 62 measure the pressure in pipe 49 but are in no way essential and may be eliminated. Shut-off valve 61 allows removal of pressure gauge 59 and the excess flow valve 62 is merely useful if parts 61 and 59 should be broken away by some force.

Operation without return line 31

The operation is the same without return line 31 if valve 28 is kept closed, provided pump 42 is so constructed that a pressure great enough to open relief valve 57 or to break line 49 cannot be generated, or if dispensing conduit coupling 68 is already in place and valves 64 and 69 are open before starting the pump.

Operation of valve 72

Let us suppose that during any of the above described operations that a break occurs in line 49 or a related line downstream of pump 42. There soon becomes greater pressure in line 37 than is being maintained in line 49 by pump 42 as the pump is still going at about the same rate and line 49 is leaking at the break. Valve head 79 is then blown off seat 78 by the greater pressure in line 37 and intake chamber 75 than exists in chamber 76 and line 49. The flow of fluid in lines 32, 37, 50 and 49 to the broken place then becomes in excess of the flow permitted by excess flow valve 33. Excess flow valve 33 "clicks" shut (the sound of sudden closing being audible with most excess flow valves) and there is no further loss of fluid from tank 7 except such negligible amount that may flow through any bleed passage (not shown) that valve 33 may have. Excess flow valve 33 may have no bleed passage, in which case there will be no further loss of fluid at all.

The term "breakage" as used in the claim is intended to cover any disconnection intentional or accidental resulting in excess flow due to increased pressure drop in the line 49. For example a grossly negligent operator could unscrew 68 from the tank being filled without closing valves 64 or 69, and the extra flow through line 50 would cause excess flow valve 33 to close, even though no actual "breakage" occurred except that the line was "broken" at the joint 68.

It is believed obvious, therefore, that I have devised a system and a valve for use in said system capable of carrying out the objects of the invention and that various modifications and changes may be made in this system and valve without departing from the scope of my invention which is defined only in the following claims.

Having described my invention, I claim:

1. In a liquefied gas dispensing system comprising in combination a tank containing liquefied gas under greater than atmospheric pressure, said pressure being due substantially to the vapor pressure of said liquefied gas, a dispensing pump having a normal maximum liquid withdrawal rate, a liquid eduction line connecting the intake side of said pump with said liquefied gas in said tank, an excess flow valve in said eduction line designed to substantially close said line upon flow of liquid therethrough at a rate in substantial excess of said normal maximum liquid withdrawal rate of said pump, and a liquid dispensing line for connecting the exhaust side of said pump to any suitable container, which container will provide sufficient resistance to flow of liquid from said dispensing line so that said pump normally keeps said dispensing line at least substantially the same pressure as said eduction line, the improvement comprising a by-pass line connecting said dispensing line to said eduction line at a point between said excess flow valve and said pump, and a check valve preventing flow from said dispensing line to said eduction line but opening for flow from said eduction line to said dispensing line whenever the pressure in said eduction line substantially exceeds that in said dispensing line.

2. In a liquefied gas dispensing system comprising in combination a tank containing liquefied gas under greater than atmospheric pressure, said pressure being due substantially to the vapor pressure of said liquefied gas, a dispensing pump having a normal maximum liquid withdrawal rate, a liquid eduction line connecting the intake side of said pump with said liquefied gas in said tank, an excess flow valve in said eduction line designed to substantially close said line upon flow of liquid therethrough at a rate in substantial excess of said normal maximum liquid withdrawal rate of said pump, and a liquid dispensing line for connecting the exhaust side of said pump to any suitable container, which container will provide sufficient resistance to flow of liquid from said dispensing line so that said pump normally keeps said dispensing line at least substantially the same pressure as said eduction line, the improvement comprising a by-pass line connecting said dispensing line to said eduction line at a point between said excess flow valve and said pump, and a check valve preventing flow from said dispensing line to said eduction line but opening for flow from said eduction line to said dispensing line whenever the pressure in said eduction line substantially exceeds that in said dispensing line, said normal maximum withdrawal rate of said pump being substantially less than the rate of flow which would be normally induced by the pressure in said tank through said excess flow valve, eduction line, by-pass line, check valve and dispensing line directly to the atmosphere, whereby upon substantial breakage or disconnection of any portion of said lines at any point more remote from said tank than said excess flow valve, the flow through the excess flow valve will close the same, thereby preventing further loss of said liquefied gas to the atmosphere at any substantial rate.

THEODORE A. ST. CLAIR.

REFERENCES CITED

The following references are of record in the file of this patent:

UNITED STATES PATENTS

| Number | Name | Date |
|---|---|---|
| 1,897,167 | Thomas | Feb. 14, 1933 |
| 2,362,724 | Shea | Nov. 14, 1944 |